United States Patent Office 2,770,610
Patented Nov. 13, 1956

2,770,610

ESTERS OF EPOXIDIZED PHOSPHONIC ACIDS AND HALOGENATED ORGANIC MATERIALS STABILIZED THEREWITH

Edgar E. Hardy and Theodor Reetz, Anniston, Ala., assignors to Monsanto Chemical Company, St. Louis, Mo., a corporation of Delaware No Drawing. Application October 30, 1952,
Serial No. 317,832

3 Claims. (Cl. 260—45.8)

This invention provides a series of new chemical compounds having the following probable structure

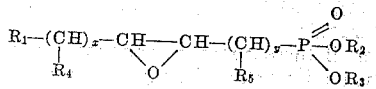

in which $R_1$, $R_4$ and $R_5$ are selected from the group consisting of hydrogen, alkyl, cycloalkyl and aryl radicals, $R_4$ and $R_5$ may vary from methylene unit to methylene unit in said $$-(CH)_x- \text{ and } -(CH)_y-$$

groups, $R_2$ and $R_3$ are selected from the group consisting of alkyl radicals, aryl radicals and a metal, $x$ has a value ranging from 0 to 8 and $y$ is at least equal to 1.

In the new compounds, $R_1$, $R_2$, $R_3$, $R_4$, and $R_5$ may be the same or different radicals, and when they stand for aliphatic radicals, it is to be understood that they represent both the straight chain and branched chain, the saturated and unsaturated, and the cycloalkyl radicals. Typical examples of these radicals are methyl, ethyl, n-propyl, isopropyl, n-butyl, isobutyl, secondary amyl, 2-ethyl hexyl, n-hexyl, n-octyl, cyclohexyl, benzyl, phenyl, tolyl and naphthyl.

The new phosphonic acid esters may be readily prepared by heating, under refluxing conditions, substantially equimolecular proportions of trisubstituted organic phosphites and epihalohydrins. The resulting reaction proceeds in accordance with the following equations:

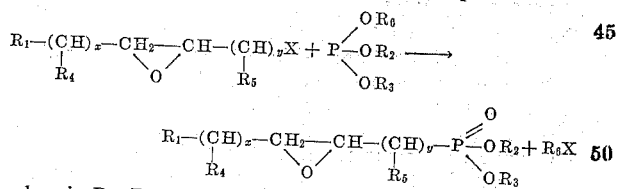

wherein $R_1$, $R_2$, $R_3$, $R_4$ and $R_5$ have the same significance as given above, $R_6$ is an alkyl radical and X is selected from the group consisting of chlorine, bromine and iodine.

Epihalohydrins used in preparing these esters have the general formula

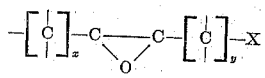

wherein X is a halogen atom, such as chlorine, bromine and iodine and $x$ and $y$ have the same significance as set forth above. Typical epihalohydrins are epichlorohydrin, epibromchydrin and epiiodohydrin. These three compounds are all characterized by a three-carbon chain; however, analogs of these epihalohydrins may also be used. Examples of the latter are β-methylepichlorohydrin and α-methylepichlorohydrin. It will be noted that epifluorohydrin and its analogs are not referred to above. As fluorine is rather unreactive in such epoxy compounds, the latter are not within the scope of the instant invention.

Another method of preparing the phosphonic acid esters involves the reaction of unsaturated organic halides with the alkali metal salts of dialkyl or diaryl phosphites to form the corresponding phosphonic acid ester which is then converted to the corresponding epoxy compound by epoxidation of the double bond. These reactions proceed in accordance with the following equations:

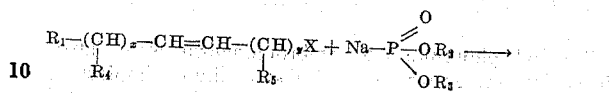

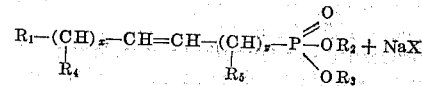

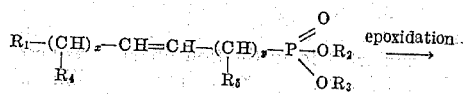

wherein $R_1$, $R_2$, $R_3$, $R_4$, $R_5$, X, $x$ and $y$ have the same significance as given above.

The corresponding salts and ester-salts are prepared by hydrolyzing and saponifying the unsaturated esters and then epoxidizing the resulting products by means of the oxidizing agents hereinafter referred to. These reactions may be represented by the following equations:

(a)

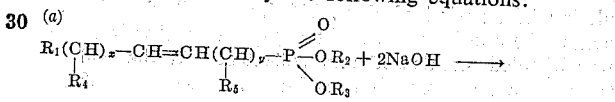

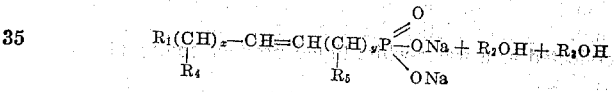

(a')

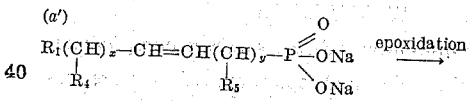

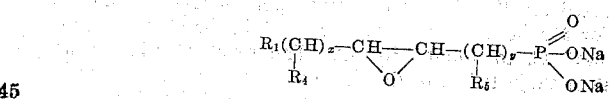

(b)

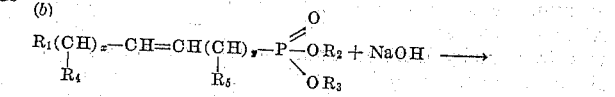

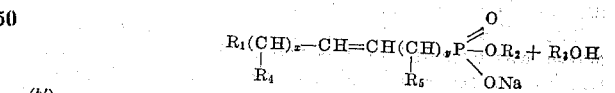

(b')

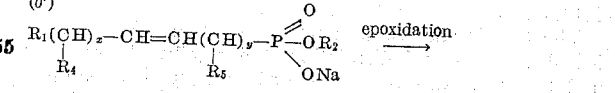

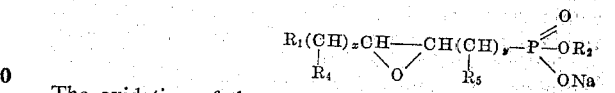

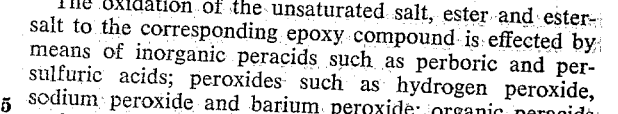

The oxidation of the unsaturated salt, ester and ester-salt to the corresponding epoxy compound is effected by means of inorganic peracids such as perboric and persulfuric acids; peroxides such as hydrogen peroxide, sodium peroxide and barium peroxide; organic peracids such as peracetic, perbenzoic acid, etc.

In a similar manner, using metallic oxides, other hydroxides and soluble salts, other metallic salts of epoxidized phosphonic acids and partial esters may be produced.

The preparation of the compounds of this invention is shown in the following illustrative examples:

EXAMPLE I

*Preparation of diethyl 2,3-epoxypropanephosphonate*

The apparatus used in practicing this embodiment of the invention included a round bottom flask provided with a condenser which was heated to 50° C. to 60° C. This condenser was connected to a second condenser which was cooled by means of ice water. In the first condenser the epihalohydrin was condensed and returned to the round bottom flask and in the second condenser the alkyl halide was liquefied and then conveyed into a graduated cylinder.

Triethyl phosphite and epibromohydrin were introduced into the above flask in substantially equimolecular proportions and heated at a temperature in the range of about 135° C. to about 154° C. until the reaction had proceeded substantially to completion. The reaction mixture was then subjected to distillation under a reduced pressure of about 35 mm. Hg to remove the unreacted epibromohydrin and the triethyl phosphite. Thereupon, the residue was subjected to distillation under a reduced pressure of about 1.5 mm. Hg and a fraction boiling at about 101° C. was recovered. On analysis, this product was found to be diethyl 2,3-epoxypropanephosphonate.

EXAMPLE II

*Preparation of diethyl-2,3-epoxypropanephosphonate*

Triethyl phosphite and epibromohydrin were reacted together in the apparatus described in Example I in a molar ratio of phosphite to epibromohydrin of substantially 1.5:1. The reaction took place at a temperature ranging from 142° C. to 172° C. and proceeded to completion in a period of about 2¼ hours. During the reaction, the relatively low boiling by-product ethyl bromide was distilled, condensed and collected. At the end of the reaction, the resulting residue was subjected to fractional distillation under a reduced pressure of about 1.5 mm. Hg and diethyl-2,3-epoxypropanephosphonate was collected as a water-white liquid product boiling at about 101° C.

EXAMPLE III

*Preparation of di-n-butyl 2,3-epoxypropanephosphonate*

Tri-n-butyl phosphite and epibromohydrin were reacted together in substantially equimolecular proportions for 3⅓ hours at a temperature within the range of about 144° C. to about 160° C. The reaction mixture was then subjected to distillation under a reduced pressure of 30 mm. Hg to remove the low boiling n-butyl bromide. After removal of this low boiling impurity, the mixture was fractionally distilled under a reduced pressure of about 1.5 mm. Hg and a fraction boiling at a temperature of about 125° C. to about 135° C. was recovered.

The entire procedure was repeated, except that the reaction was executed in a period of 30 minutes, and a fraction was recovered which boiled in the range of about 120° C. to about 140° C./3 mm. Hg.

The two fractions thus obtained were mixed and subjected to fractional distillation under reduced pressure and two products were recovered, namely, one boiling within the range of 90° C. to 148° C. and one boiling within the range of about 149° C.–151° C. The second product was analyzed and found to contain about 12.2% phosphorus as compared to 12.4% for the compound dibutyl-2,3-epoxypropanephosphonate, thus indicating that the second product was the substantially pure material.

EXAMPLE IV

*Preparation of 9,10-epoxyoctadecane phosphonic acid dibutyl ester*

Approximately 35 grams of 9,10-oleyl phosphonic acid dibutyl ester prepared from oleyl chloride and sodium dibutyl phosphite was mixed with about 40 cc. of a 2-molar solution of peracetic acid in acetic acid and heated, with stirring, for 3 hours at about 35° C. The resulting reaction mixture was treated with 75 cc. of benzene and 50 cc. of a 15% solution of sodium chloride in water. The product so treated was allowed to stand and separate into layers, namely, an aqueous layer and a benzene layer. The benzene layer was separated and washed three times with a sodium chloride solution and finally with water. After drying with anhydrous sodium sulfate, the benzene layer was subjected to distillation under reduced pressure at a temperature of about 100° C. to separate the benzene, and about 30.8 grams of a pale yellow colored oil was recovered as a residue. This oil contained about 33.4% by weight of 9,10-epoxyoctadecane phosphonic acid dibutyl ester.

The products of the instant invention display the reactions characteristic of epoxy compounds.

For example, if these compounds are reacted with hydrochloric acid, the epoxy groups open up and add hydrogen chloride to form the corresponding chlorohydrins. This can be shown by titrating the excess acid and then regenerating the epoxy compound by removal of the hydrogen chloride by means of an alkali such as sodium hydroxide.

Moreover, if these epoxy compounds are treated with aqueous magnesium chloride, the epoxy groups open up and add hydrogen chloride to form the chlorohydrin and magnesium hydroxide. The chlorohydrin thus obtained is also converted to the epoxy compound by means of an alkali such as sodium hydroxide.

The products of the instant invention are suitable for use as heat stabilizers for polyvinyl chloride and in this application they are superior to phenoxypropene oxide—a compound used commercially for this purpose. As evidence of this fact, reference is made to the experimental data hereinafter presented.

The following compositions were milled for 5 minutes at 165° C. and then formed into thin films of uniform thickness.

|  | Blank | Composition A | Composition B |
| --- | --- | --- | --- |
|  | Parts | Parts | Parts |
| Polyvinyl chloride | 10 | 10 | 10 |
| Dioctyl phthalate | 5 | 5 | 5 |
| Barium cadmium laurate | 0.1 | 0.1 | 0.1 |
| Phenoxypropene oxide |  | 0.1 |  |
| Diethyl 2,3-epoxypropene phosphonate |  |  | 0.1 |

The films thus obtained were heated to a temperature of 160° C. for 2⅓ hours and at the end of this time, the film prepared from Composition B was lighter in color than the Blank or Composition A, thus demonstrating that diethyl 2,3-epoxypropane phosphonate is a more effective heat stabilizer than phenoxypropene oxide.

The products of this invention are also useful as hydrogen halide scavengers for dielectric and other compositions containing halogenated organic compounds such as chlorinated naphthalene, chlorinated diphenyl ketone, chlorinated diphenyl oxide, chlorinated diphenyl methane, chlorinated diphenyl ethane, chlorinated benzene, chlorinated toluene, chlorinated biphenyl, chlorinated 1:3:3-trimethyl-1-phenyl-indane, chlorinated 1:3:3:6 tetramethyl-1-(4' methyl-phenyl) indane, chlorinated nitro diphenyl, chlorinated alkylated benzenes, chlorinated alkylated biphenyls, ethyl trichlorobenzene, ethyl tetrachlorbenzene, ethyl pentachlorobenzene, chlorinated terphenyls, chlorinated quaterphenyls, chlorinated paraffinic hydrocarbons, chlorinated alicyclic hydrocarbons, chlorinated oxygen-containing organic compound, chlorinated rubber, chlorobutadiene polymers, chlorinated fats, chlorinated vegetable oils, chlorinated animal oils, chlorinated mineral oils and the corresponding fluorine, bromine and iodine derivatives thereof or mixtures of two or more of these; as extreme pressure lubricant additives; as plasticizers for synthetic resins; as flameproofing agents; as heat and light stabilizers for halogenated polymers and copolymers and for polymers and copolymers of vinyl halides, vinylidene halides, dichlorostyrene, chlorobutadiene and polymerizable halogenated organic compounds generally; and as intermediates in the preparation of other compounds and compositions.

As many widely different embodiments of this invention may be made without departing from the spirit and scope thereof, it is to be understood that it is not limited to the specific embodiments thereof except as defined in the appended claims.

What we claim is:

1. As a new compound, di-n-butyl 9,10-epoxyoctadecane phosphonate.

2. A halogenated organic material containing stabilizing amounts of di-n-butyl 9,10-epoxyoctadecane phosphonate.

3. A polyvinyl chloride resin containing stabilizing amounts of di-n-butyl 9,10-epoxyoctadecane phosphonate.

UNITED STATES PATENTS

References Cited in the file of this patent

| | | |
|---|---|---|
| 2,564,195 | De Nie | Aug. 14, 1951 |
| 2,627,521 | Coover | Feb. 3, 1953 |